United States Patent
Jas et al.

(10) Patent No.: US 10,637,887 B2
(45) Date of Patent: Apr. 28, 2020

(54) SYSTEM FOR QUERY INJECTION DETECTION USING ABSTRACT SYNTAX TREES

(71) Applicant: Cyphort Inc., Santa Clara, CA (US)

(72) Inventors: Frank Jas, Scotts Valley, CA (US); Fengmin Gong, Livermore, CA (US)

(73) Assignee: Cyphort Inc., Santa Clara, CA (US)

( * ) Notice: Subject to any disclaimer, the term of this patent is extended or adjusted under 35 U.S.C. 154(b) by 174 days.

(21) Appl. No.: 15/858,710

(22) Filed: Dec. 29, 2017

(65) Prior Publication Data

US 2019/0207974 A1 Jul. 4, 2019

(51) Int. Cl.
*H04L 29/06* (2006.01)
*G06F 16/2455* (2019.01)
*G06F 21/62* (2013.01)

(52) U.S. Cl.
CPC .... *H04L 63/1466* (2013.01); *G06F 16/24565* (2019.01); *G06F 21/6227* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0024572 A1* | 1/2009 | Mehta | ............... | G06F 16/24542 |
| 2009/0125496 A1* | 5/2009 | Wexler | ............. | G06F 16/24553 |
| 2012/0084423 A1* | 4/2012 | McGleenon | ........ | H04L 61/1511 709/223 |
| 2014/0201836 A1* | 7/2014 | Amsler | ............... | H04L 63/1425 726/23 |
| 2016/0292430 A1* | 10/2016 | Antonopoulos | ...... | G06F 21/602 |
| 2016/0364444 A1* | 12/2016 | Bisaga | ................ | G06F 21/6227 |
| 2017/0024572 A1* | 1/2017 | Ferraiolo | .............. | G06F 21/604 |
| 2017/0078324 A1* | 3/2017 | Bordawekar | ....... | H04L 63/1458 |
| 2017/0109541 A1* | 4/2017 | Ionescu | ................. | G06F 16/285 |
| 2017/0265076 A1* | 9/2017 | Richards | ................. | H04L 47/10 |
| 2018/0013793 A1* | 1/2018 | Belamaric | .............. | H04L 63/20 |

FOREIGN PATENT DOCUMENTS

EP  2521049 A1  11/2012

OTHER PUBLICATIONS

Buehrer G.T., et al., "Using Parse Tree Validation to Prevent SQL Injection Attacks," Proceedings of the 5th International Workshop on Software Engineering and Middleware, Sep. 2005, pp. 106-113.
Extended European Search Report for Application No. EP18197668. 9, dated Apr. 17, 2019, 9 pages.
Wanglu., et al., "Design of Code Security Detection System Based on Rule Inspection," International Conference on Information, Networking and Automation (ICINA), Oct. 2010, pp. V2-346-V2-349.

* cited by examiner

*Primary Examiner* — Malcolm Cribbs
(74) *Attorney, Agent, or Firm* — Harrity & Harrity, LLP

(57) ABSTRACT

A device may include one or more memories; and one or more processors, communicatively coupled to the one or more memories, to receive a query for data stored by a database; generate an abstract syntax tree based on the query; determine whether the abstract syntax tree matches a list, where the list identifies one or more abstract syntax trees corresponding to queries or types of queries; and selectively perform an action based on whether the abstract syntax tree matches the entry of the list.

20 Claims, 5 Drawing Sheets

SYSTEM FOR QUERY INJECTION DETECTION USING ABSTRACT SYNTAX TREES

BACKGROUND

As computer networks grow and the amount of data stored on computers and databases interconnected by those networks grows, so have attempts to gain unauthorized access to these computers and databases. One class of attacks against a relational database, such as a structured query language (SQL) database, is an injection attack. In an injection attack, an attacker injects a malicious sequence of SQL queries into the database server to achieve code injection or malicious actions on the database server. The attack may be launched through compromised web application servers. Injection attacks are a significant vulnerability to relational databases because some current systems may fail to detect database queries in a sequence that results in unexpected or unauthorized database access.

DETAILED DESCRIPTION

The following detailed description of example implementations refers to the accompanying drawings. The same reference numbers in different drawings may identify the same or similar elements.

A relational database server, such as a SQL server, may be vulnerable to malicious attacks such as injection attacks. In an injection attack, an entity may gain access to a database, then may query the database for a large number of records in the hopes of obtaining customer information, such as contact information, financial information, password information, and/or the like. It may be beneficial to detect injection attacks in order to prevent the theft of sensitive information. However, due to subtle differences in structure, syntax, and content of the queries used to carry out an injection attack, it may be difficult to define, a priori, useful rules for detecting an injection attack. For example, the subtle differences may necessitate the creation of an unduly burdensome number of rules, and application of such a large number of rules may create significant load.

Some implementations described herein may provide for detection of malicious queries (e.g., associated with an injection attack) based on abstract syntax trees. For example, some implementations described herein may generate an abstract syntax tree based on a query, may check the abstract syntax tree against an abstract syntax tree whitelist, and, when the abstract syntax tree is not identified by the whitelist, may perform an action. When it is determined that the query is not malicious, the query may be added to the whitelist. In this way, abstract syntax trees are used to detect anomalous queries, which may be more flexible and computationally efficient than other approaches for detecting anomalous queries, such as statistical approaches and/or the like. Furthermore, abstract syntax trees enable the usage of threshold-based similarity comparisons between queries and whitelist entries, weighted comparisons between queries and whitelist entries, and/or the like, thereby increasing versatility and effectiveness of implementations described herein and reducing false positives based on inexact matches with the whitelist.

Figure 1:
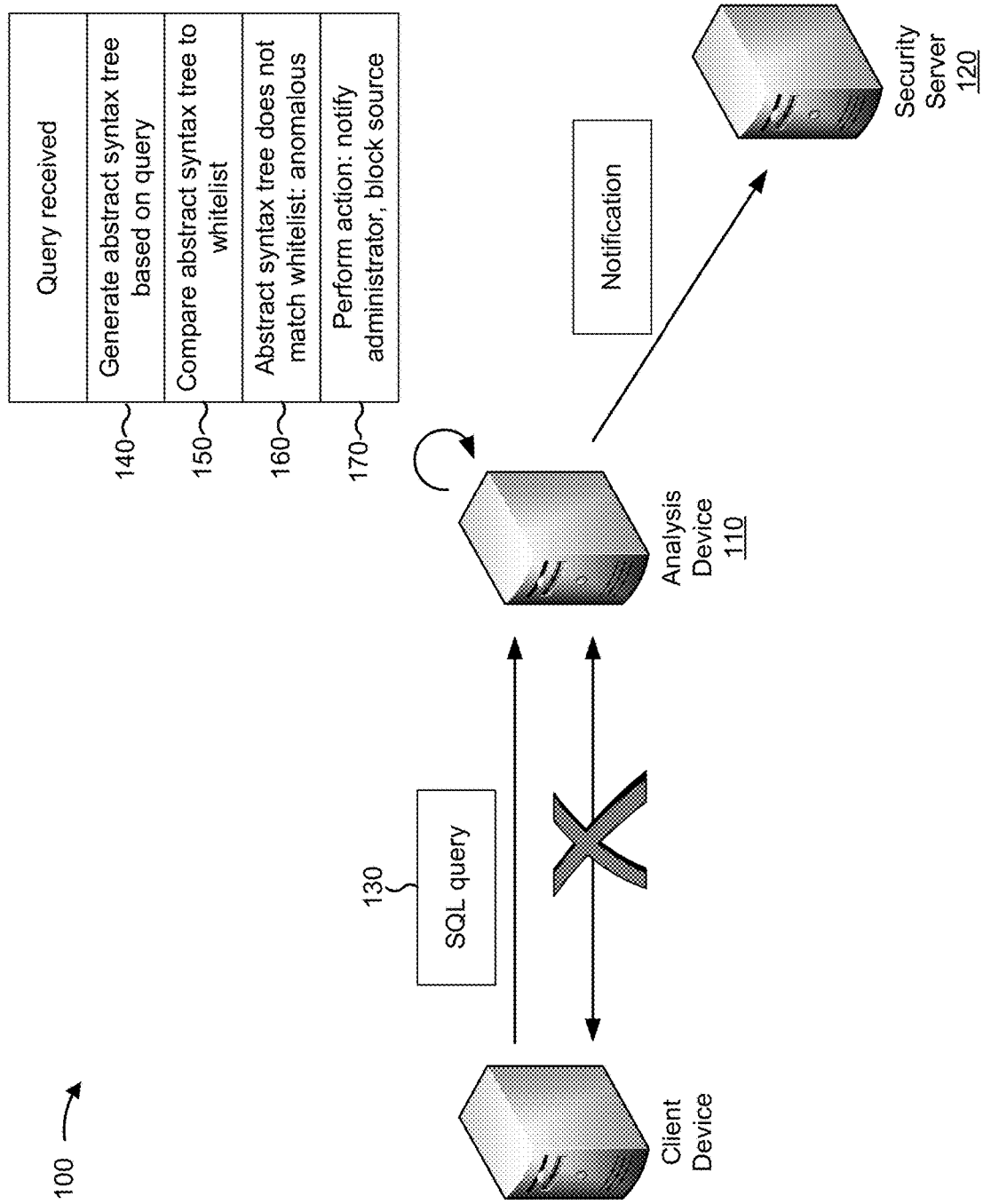
FIG. 1 is a diagram of an overview of an example implementation described herein.

FIG. 1 is a diagram of an overview of an example implementation 100 described herein. As shown, implementation 100 includes an analysis device 110 (e.g., analysis device 220 described in more detail in connection with FIGS. 2 and 6) and a security server 120 (e.g., security server 210 as described in more detail in connection with FIG. 2).

As shown by reference number 130, analysis device 110 may receive a query from a client device. For example, the query may include a SQL query, although the query may include any query (e.g., a query for a relational database or another type of query). As shown by reference number 140, analysis device 110 may generate an abstract syntax tree, as described in more detail elsewhere herein. As shown by reference number 150, analysis device 110 may compare the abstract syntax tree to a whitelist. For example, the whitelist may identify abstract syntax trees for queries that are deemed to be permissible for processing by a storage device. In some implementations, the whitelist may be populated as permissible queries are encountered, as described in more detail below.

As shown by reference number 160, analysis device 110 may determine that the abstract syntax tree does not match the whitelist, as described in more detail elsewhere herein. As shown by reference number 170, based on the abstract syntax tree not matching the whitelist, analysis device 110 may perform one or more actions. For example, analysis device 110 may notify an administrator associated with security server 120. As another example, analysis device 110 may block a source of the query (e.g., client device 240). In some implementations, analysis device 110 may perform another action, as described in more detail elsewhere herein.

In this way, analysis device 110 uses abstract syntax trees to detect anomalous queries, which may be more flexible and computationally efficient than other approaches for detecting anomalous queries, such as statistical approaches and/or the like. Furthermore, abstract syntax trees enable the usage of threshold-based similarity comparisons between queries and whitelist entries, weighted comparisons between queries and whitelist entries, and/or the like, thereby increasing versatility and effectiveness of implementations described herein and reducing false positives based on inexact matches with the whitelist.

As indicated above, FIG. 1 is provided merely as an example. Other examples are possible and may differ from what was described with regard to FIG. 1.

Figure 2:
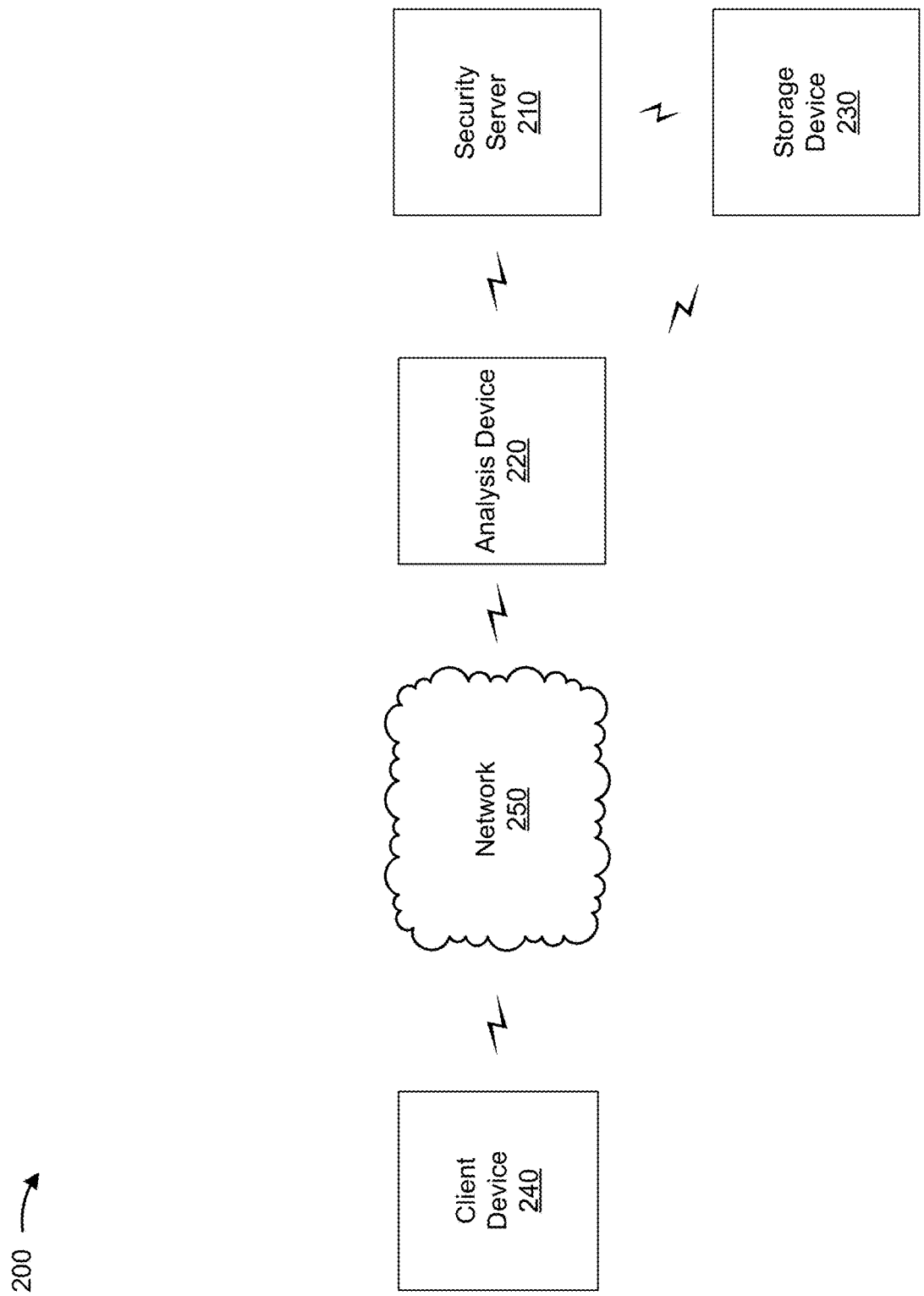
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a security server 210, an analysis device 220, a storage device 230, a client device 240, and a network 250. Devices of environment 200 may interconnect via wired connections, wireless connections, or a combination of wired and wireless connections.

Security server 210 includes one or more devices capable of receiving, generating, storing, processing, and/or providing queries and information associated with queries, such as an abstract syntax tree describing a query, a whitelist of abstract syntax trees associated with queries, and/or similar information. For example, security server 210 may include a network device (e.g., a firewall, a router, a gateway, a switch, a hub, a bridge, a reverse proxy, a server (e.g., a proxy server), a security device, an intrusion detection device, a load balancer, or a similar device), a server device, and/or the like. In some implementations, security server 210 may include one or more devices associated with an administrator of storage device 230 and/or a database associated with storage device 230. For example, security server 210 may include a user device (e.g., a smart phone, a laptop computer, a tablet computer, a handheld computer, and/or the like) or a similar device Analysis device 220 includes one or more devices capable of collecting, receiving, and/or analyzing a query en route to storage device 230. For example, analysis device 220 may include a network device (e.g., a firewall, a router, a gateway, a switch, a hub, a bridge, a reverse proxy, a server (e.g., a proxy server), a security device, an intrusion detection device, a load balancer, or a similar device). In some implementations, environment 200 may include multiple, different analysis devices 220. In some implementations, analysis device 220 may be included in security server 210, or security server 210 may be included in analysis device 220. In some implementations, analysis device 220 may include one or more collectors, as described in more detail elsewhere herein.

Storage device 230 includes a storage device, such as a server device, a user device (e.g., a personal computer, a laptop computer, and/or the like), or another device capable of storing a database such as a relational database. Storage device 230 may store the database, and may provide data from the database based on queries received from another device e.g., client device 240, security server 210, etc.). In some implementations, environment 200 may include multiple, different storage devices 230.

Client device 240 includes one or more devices capable of submitting a query, such as a relational database query. For example, client device 240 may include a network device, a user device (e.g., a smart phone, a laptop computer, a tablet computer, a handheld computer, and/or the like), a server device, a bot net, a hijacked device, and/or the like.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
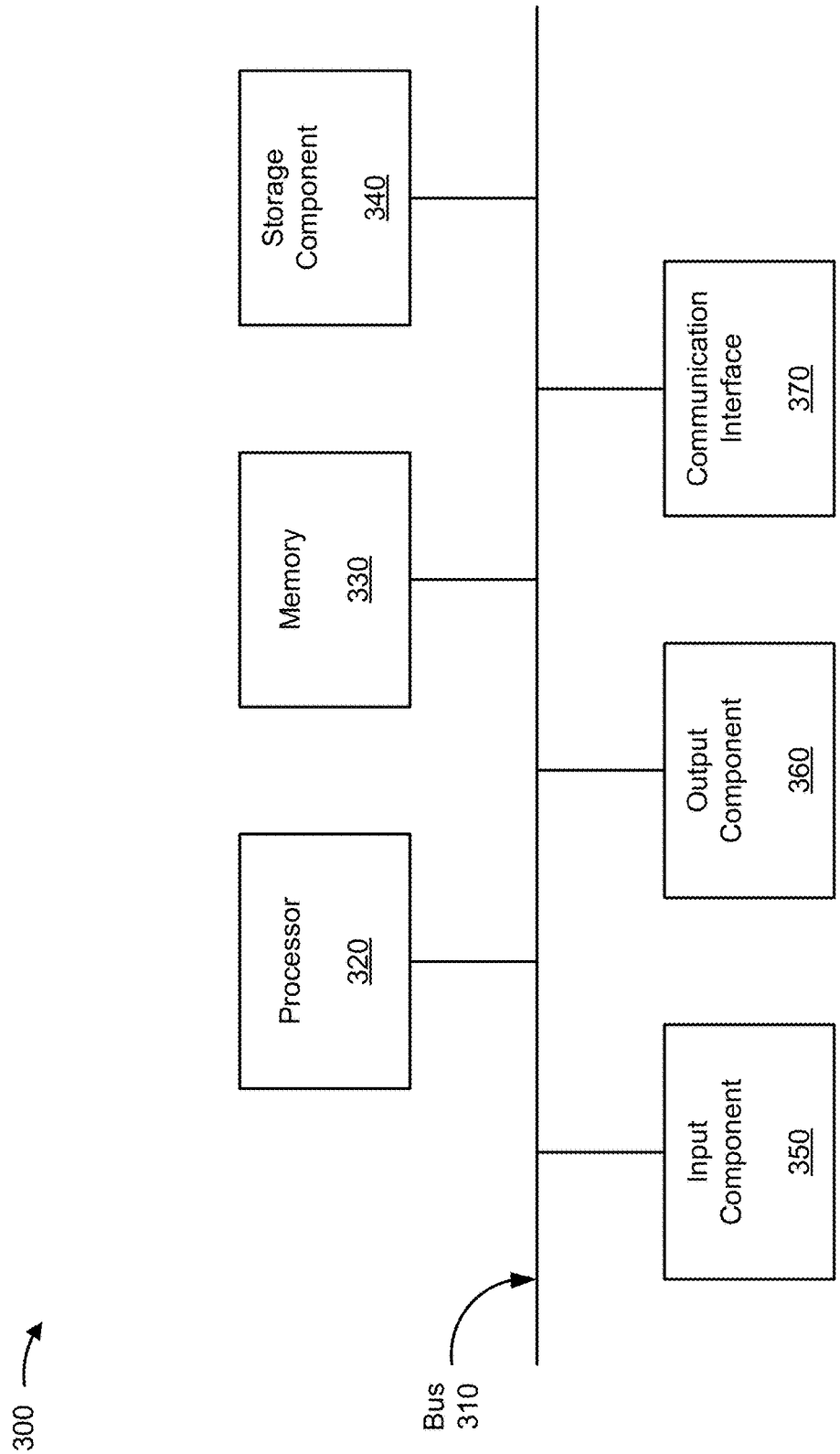
FIG. 3 is a diagram of example components of one or more devices of FIG. 2.

FIG. 3 is a diagram of example components of a device 300. Device 300 may correspond to security server 210, analysis device 220, storage device 230, and client device 240. In some implementations, security server 210, analysis device 220, storage device 230, and/or client device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
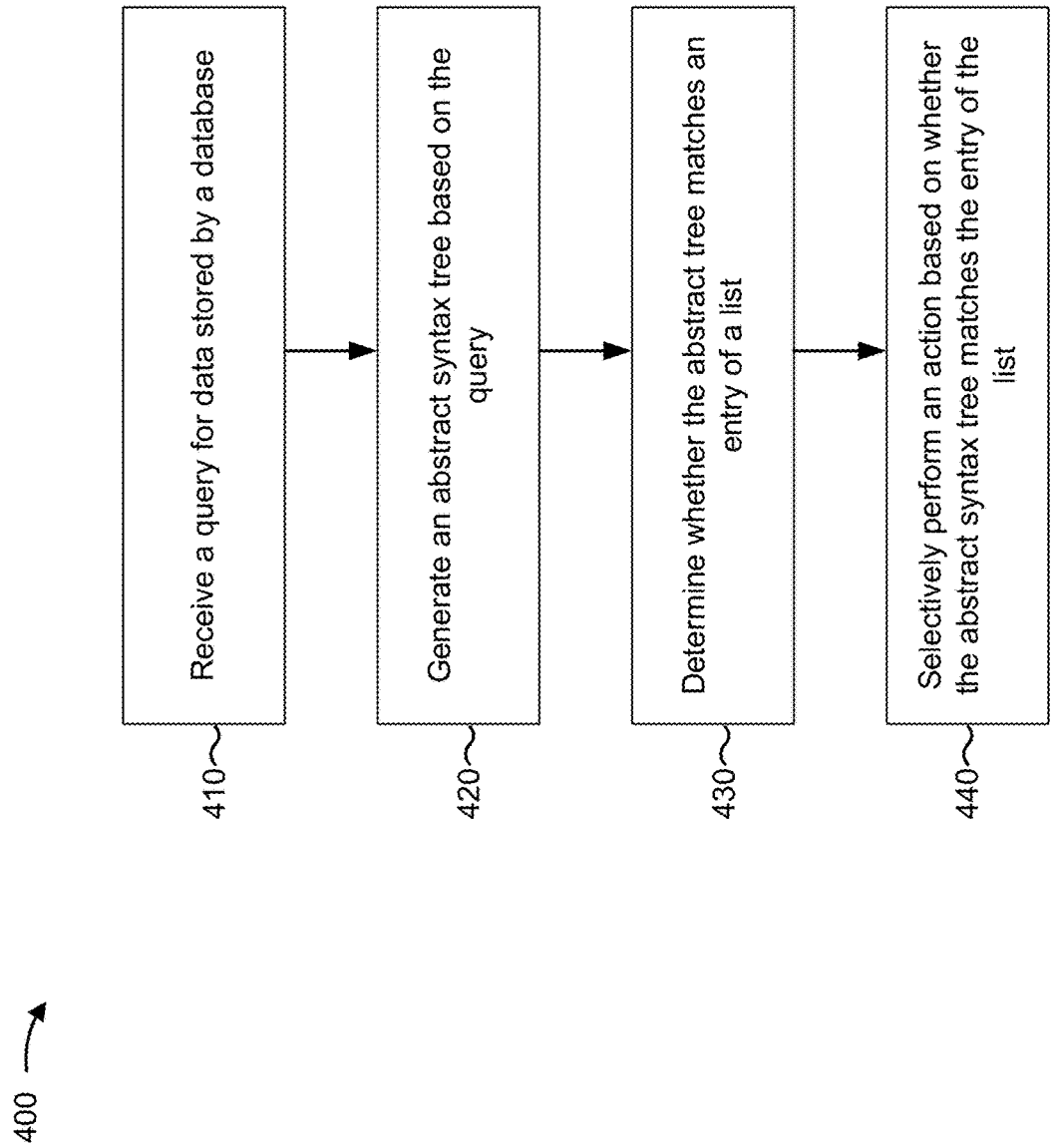
FIG. 4 is a flow chart of an example process for processing relational database queries based on abstract syntax trees.

FIG. 4 is a flow chart of an example process 400 for processing relational database queries based on abstract syntax trees. In some implementations, one or more process blocks of FIG. 4 may be performed by analysis device 220. In some implementations, one or more process blocks of FIG. 4 may be performed by another device or a group of devices separate from or including analysis device 220, such as security server 210, storage device 230, and/or client device 240.

As shown in FIG. 4, process 400 may include receiving a query for data stored by a database (block 410). For example, analysis device 220 may receive a query en route to storage device 230 that stores a database. In some implementations, analysis device 220 may receive the query from client device 240. For example, analysis device 220 may receive (e.g., intercept, detect, etc.) the query en route from client device 240 to storage device 230.

In some implementations, the query may include a relational database query, such as a SQL query or a query for another relational database language. However, implementations described herein are not necessarily limited to those involving queries for relational databases, and may be implemented for any type of query. Analysis device 220 may receive the query to determine whether the query is anomalous, as described in more detail below. For example, in some cases, a malicious entity may penetrate one or more layers of security to gain access to storage device 230. In such a case, the malicious entity may want to access records stored by storage device 230. For example, the malicious entity may want to access a large volume of sensitive information, a particular type of information (e.g., contact information, passwords, password hashes, banking information, financial information, medical information, voter records, etc.), or some other type of information stored by the database. The malicious entity may provide a query to access this information.

As further shown in FIG. 4, process 400 may include generating an abstract syntax tree based on the query (block 420). For example, analysis device 220 may generate an abstract syntax tree based on the query. An abstract syntax tree, sometimes abbreviated AST, is a tree representation of the abstract syntactic structure of code. Each node of the abstract syntax tree may denote a construct occurring in the code. Here, the code is the query received by analysis device 220. In some implementations, analysis device 220 may be capable of efficiently generating an abstract syntax tree, since generating an abstract syntax tree is already part of a processing procedure that analysis device 220 may perform for the query. Therefore, implementations described herein may not be computationally burdensome in comparison to other techniques of detecting anomalous queries, such as statistical methods and/or the like.

In some implementations, analysis device 220 may determine whether to generate an abstract syntax tree for a query. For example, analysis device 220 may determine whether to generate an abstract syntax tree based on a source of a query (e.g., may determine to generate an abstract syntax tree based on a query being from a particular source or may determine not to generate an abstract syntax tree based on a query being from the particular source). As another example, analysis device 220 may determine whether to generate an abstract syntax tree based on a particular number of queries (e.g., from a particular source or set of sources) being received in a threshold amount of time. For example, analysis device 220 may generate an abstract syntax tree for one or more queries when the particular number of queries has been received from the particular source or set of sources in the threshold amount of time.

Generating an abstract syntax tree may be beneficial for analysis device 220 for a variety of reasons. For example, and as described above, analysis device 220 may be efficient at generating an abstract syntax tree since analysis device 220 may already use abstract syntax trees when processing queries. This also means that a new procedure or technique for generating data structures to identify anomalous queries does not need to be defined, which saves development time and resources of analysis device 220. Furthermore, and as described in more detail below, abstract syntax trees allow for analysis device 220 to make threshold-based comparisons between queries, so that queries having a threshold similarity to whitelisted queries can be easily identified. Still further, an abstract syntax tree can account for subtle differences between queries that might foil an anomalous query detection system that is based on a priori definition of rules.

As further shown in FIG. 4, process 400 may include determining whether the abstract syntax tree matches a list (block 430). For example, analysis device 220 may determine whether the abstract syntax tree matches an entry of a list. The list may identify abstract syntax trees. For example, the list may be a whitelist of abstract syntax trees corresponding to permissible queries. While the implementations described herein are sometimes described with regard to lists, any data structure may be used to store or identify abstract syntax trees corresponding to queries (e.g., a graph data structure, a relational data structure, etc.).

In some implementations, analysis device 220 may store the list. This may conserve network resources and reduce latency associated with checking a list stored by another device. In some implementations, another device (e.g., security server 210, storage device 230, etc.) may store the list. This may conserve local storage resources of analysis device 220. In some implementations, security server 210 may store the list, and may provide periodic updates regarding the list to analysis device 220. In this way, a central repository of lists may be maintained, enabling addition of list entries regarding queries received from many different analysis devices 220.

In some implementations, the list may identify abstract syntax trees associated with a whitelist (e.g., abstract syntax trees associated with permissible queries). Using a whitelist to identify abstract syntax tree queries may permit the adaptive updating of the whitelist as more permissible queries are encountered (e.g., based on an administrator approving the queries). This may be more efficient than trying to define a blacklist using a priori rules, since variations in syntax may defeat a blacklist. In some implementations, the list may identify abstract syntax trees associated with queries that are to be rejected or flagged for notification (e.g., abstract syntax trees associated with a blacklist or graylist). For example, a blacklist might identify abstract syntax trees for which a client device 240, from which the blacklisted query is received, should be blocked. In some implementations, the list may identify whitelisted abstract syntax trees and blacklisted or graylisted abstract syntax trees.

In some implementations, analysis device 220 may determine whether the abstract syntax tree matches the list based on a threshold. For example, analysis device 220 may compare the abstract syntax tree to one or more abstract syntax trees of the list. When a similarity score between the abstract syntax tree and the one or more abstract syntax trees satisfies a threshold, analysis device 220 may determine that the abstract syntax tree matches the list. When the similarity score does not satisfy the threshold, analysis device 220 may determine that the abstract syntax tree does not match the list. Using a threshold may further improve robustness of identification of anomalous queries, and may reduce processor usage that may otherwise be incurred based on identifying a query that does not exactly match a whitelist.

As further shown in FIG. 4, process 400 may include selectively performing an action based on whether the abstract syntax tree matches the list (block 440). For example, analysis device 220 may perform an action based on whether the abstract syntax tree matches the list (e.g., any entry of the list). As an example, assume that the list is a whitelist. In that case, analysis device 220 may forward the query to the storage device 230 for provision of the data associated with the query when the abstract syntax tree matches the list. Furthermore, when the abstract syntax tree does not match the list, analysis device 220 may perform another action, such as notifying an administrator, providing the query to security server 210, flagging the query for review (e.g., by the administrator), blocking client device 240 from which the query was received, quarantining storage device 230, and/or the like. As another example, assume that the list is a blacklist. When the abstract syntax tree matches the list, analysis device 220 may perform an action, such as notifying an administrator, flagging the query for review (e.g., by the administrator), blocking client device 240 from which the query was received, quarantining storage device 230, and/or the like. In some implementations, security server 210 may perform the action. For example, analysis device 220 may determine that the query does not match the whitelist, and may provide the query to security server 210 for determination of an action to perform.

In some implementations, analysis device 220 may update the list and/or a criterion for determining whether the abstract syntax tree matches the list. For example, when the list is a whitelist, and when an abstract syntax tree for a query does not match the list and is later approved as permissible (e.g., by an administrator), analysis device 220 may add the abstract syntax tree for the query to the list. Additionally, or alternatively, analysis device 220 may update a threshold used to determine whether the abstract syntax tree matches the list. For example, if a particular query (e.g., abstract syntax tree) is determined not to match a whitelist based on the particular query (e.g., abstract syntax tree) not satisfying a threshold, and is later determined to be permissible, analysis device 220 may adjust the threshold.

In some implementations, analysis device 220 may determine whether the abstract syntax tree matches the list, and/or may determine an action to perform, based on a model determined using a machine learning technique. For example, analysis device 220 may determine and/or train the model based on a training set of abstract syntax trees (e.g., queries) and corresponding classifications (e.g., permissible or not permissible). In some implementations, analysis device 220 may train the model based on abstract syntax trees (e.g., queries) and corresponding actions to perform with regard to the abstract syntax tree. Analysis device 220 may use the model to determine whether a query is permissible and/or an action to perform with regard to the query. In some implementations, analysis device 220 may update the model. For example, analysis device 220 may receive feedback regarding whether the query is correctly classified and/or whether the action was correctly identified. Analysis device 220 may use the machine learning technique to update parameters used to determine the classification and/or the action based on feedback. In this way, a machine learning technique may be used to determine the classification and/or the action, which improves robustness of analysis device 220 and increases accuracy of classification of queries over time.

In some implementations, security server 210 may be configured to detect unauthorized access to a database server. For an embodiment, the security server 210 receives queries addressed to one or more database servers from one or more data collectors (e.g., analysis device 220). The data collectors may be resident within or in communication with network devices such as Intrusion Prevention System (IPS) collectors, firewalls, Internet Content Adaptation Protocol (ICAP)/Web Cache Communication Protocol (WCCP) collectors, milter mail plug-in collectors, switch collectors, and/or access points. In some implementations, a collector and a network device may be two separate digital devices (e.g., see F/W collector and IDS collector). For various embodiments, a data collector may be resident within a database server, as described in more detail in connection with FIG. 2.

For an embodiment, data collectors may be at one or more points within the communication network. A data collector, which may include a tap or span port (e.g., span port IDS collector at a switch) for example, is configured to intercept network data from a network. The data collector may be configured to detect one or more queries to a database server. For example, a data collector is configured to detect one or more queries based on a destination address, header information, or other information in a data packet. For an embodiment, a data collector is configured to flag one or more queries to a database server for further processing.

The data collectors (e.g., analysis device 220), according to an embodiment, are configured to filter the one or more queries before flagging one or more queries as suspicious and/or providing the one or more queries to the security server. The data collector is configured to filter the one or more queries by generating an abstract syntax tree for each query received during a registration phase. The data collector is configured to generate an AST whitelist based on each query received during the registration phase. The AST whitelist includes a set of ASTs including an AST generated for each query received during the registration phase. For various embodiments, all requests received during the registration phase are considered legitimate requests. For other embodiments, a security server is configured to generate an AST whitelist based on the one or more queries received from one or more data collectors during a registration phase.

The data collector may be configured to operate in a detection phase. During the detection phase, the data collector is configured to analyze a query against the AST whitelist. For various embodiments, the data collector is configured to analyze a query by generating an AST for each query and matching the generated AST to the ASTs included in the AST whitelist. If the AST for the query does not match at least one of the ASTs included in the whitelist the query is flagged (e.g., as suspicious or an anomaly). For various embodiments, the query flagged by the data collector is transmitted to the security server for analysis. For some embodiments, the data collector quarantines each query flagged until an update is sent from a security server 508.

A data collector may be configured to match a generated AST of a received query to an AST in an AST whitelist by comparing the AST to find an exact match of each sub-tree of an AST with one included in the AST whitelist. The data collector, for some embodiments, may be configured to match a generated AST of a received query to an AST in an AST whitelist by comparing the generated AST to find a partial match of the generated AST with one included in the AST whitelist. For example, a match may be determined if one or more sub-trees of an AST exactly match, whereas other sub-tress of the AST may require a partial match or can be ignored. In one example, a match may be determined if at least one portion of a subtree of a generated AST matches an AST in the AST whitelist.

For various embodiments, a data collector may be configured to divide queries into one or more categories with each category having a corresponding AST whitelist. The use of partial matching and categories provide the benefit of detecting more specific anomalies across different applications, which leads to better anomaly detection.

An example of a category of queries is a SELECT query. SELECT queries contain a list of columns to retrieve in addition to various row selection conditions. From a security perspective, a change in the list of columns may be relevant whereas a change in the row selection conditions may not be relevant, because the former reflects a qualitative change to the query whereas the latter reflects a quantitative. Therefore, a data collector may be configured to match the portion of the generated AST corresponding to the column changes for SELECT queries. If a portion of the SELECT queries does not match a portion of the generated AST in the AST whitelist in the SELECT query category, a data collector may be configured to flag the query and/or generate an alert. However, a mismatch in the row selection conditions given a matching set of columns may not result in the data collector flagging the query and generating an alert.

Another example of a category of queries is web application queries. Since web applications contain a fixed number of query patterns, an AST whitelist is generated to cover the query patterns for the web applications. This approach has the benefit of providing the ability to detect qualitatively different queries not seen during the registration phase. A further benefit of this approach is that, unlike statistical methods for determining anomalies, this approach will not generate false positives if a query is only resulting in quantitative differences, for example, more or fewer rows of the same kind of data in the query.

For various embodiments, a data collector (or an agent associated with the data collector) may be configured to receive updates to the AST whitelist from the security server 508. The security server 508 may be configured to analyze the one or more queries flagged by a data collector. If one or more queries flagged by the data collector are determined to be trustworthy, that is, not malicious, the security server is configured to transmit an update to the AST whitelist to one or more data collectors in the network.

Network devices include any device configured to receive and provide data over a network. Examples of network devices include, but are not limited to, routers, bridges, security appliances, firewalls, web servers, mail servers, wireless access points (e.g., hotspots), and switches.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
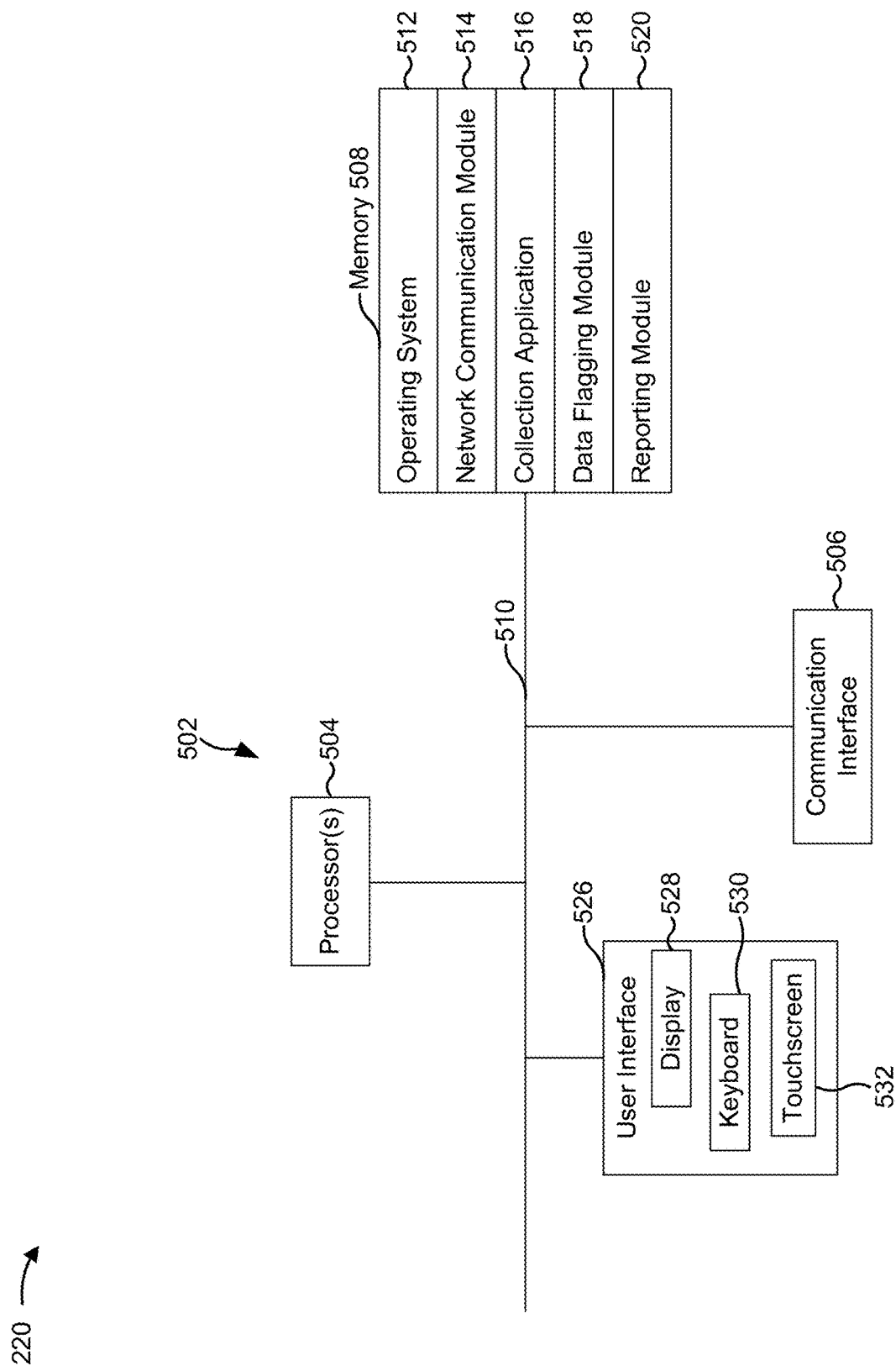
FIG. 5 illustrates an example embodiment of an analysis device.

FIG. 5 illustrates an example embodiment of analysis device 220. The system, according to an embodiment, includes one or more processing units (processors) 504, one or more communication interface 506, memory 508, and one or more communication buses 510 for interconnecting these components. The system 502 may optionally include a user interface or reporting module 526 comprising a display device 528, a keyboard 530, a touchscreen 532, and/or other input/output devices. Memory 508 may include high-speed random access memory and may also include non-volatile memory, such as one or more magnetic or optical storage disks. The memory 508 may include mass storage that is remotely located from processors 504. Moreover, memory 508, or alternatively one or more storage devices (e.g., one or more nonvolatile storage devices) within memory 508, includes a computer readable storage medium. The memory 508 may store the following elements, or a subset or superset of such elements: an operating system 512, a network communication module 514, a collection module 516, a data flagging module 518, and a reporting module 520. An operating system 512 that includes procedures for handling various basic system services and for performing hardware dependent tasks. A network communication module 514 (or instructions) that is used for connecting the system to other computers, clients, peers, systems, databases, or devices via the one or more communication interfaces 506 and one or more communication networks, such as the Internet, other wide area networks, local area networks, metropolitan area networks, and other type of networks.

A collection module 516 (or instructions) for detecting one or more queries to a database, network traffic patterns, real-time observations, indicator of a compromised entity, and other suspicious data using techniques including those described herein. Further, the collection module 516 is configured to receive network data (e.g., potentially suspicious data) from one or more sources. Network data is data or network traffic that is provided on a network from one digital device to another. The collection module 516 may flag a query as suspicious data based on, for example, whitelists, blacklists, heuristic analysis, statistical analysis, rules, or other determinations using techniques including those described herein. In some embodiments, the sources comprise data collectors configured to receive network data, such as a query to a database. For example, firewalls, IPS, servers, routers, switches, access points and the like may, either individually or collectively, function as or include a data collector. The data collector may forward network data, such as a query to a database, to the collection module 516.

For an embodiment, the data collectors filter one or more queries before providing the one or more queries to the collection module 516 using techniques including those described herein. For example, the data collector may be configured to collect or intercept one or more queries using techniques including those described herein. In some embodiments, the data collector may be configured to follow configured rules. For example, if one or more of the queries are directed between two known and trustworthy sources (e.g., the data is communicated between two devices on a whitelist), the data collector may not collect the one or more queries. In various embodiments, a rule may be used to define one or more categories of queries to analyze. In some embodiments, rules may be configured to target a class of attack or payload. In some embodiments, the system may make recommendations (e.g., via the reporting module 526) and/or configure rules for the collection module 516 and/or the data collectors. Those skilled in the art will appreciate that the data collectors may include any number of rules regarding when data is collected or what data is collected.

For an embodiment, the data collectors located at various positions in the network may not perform any assessment or determination regarding whether the collected data is suspicious or trustworthy. For example, the data collector may collect all queries received and provide the collected queries to the collection module 516 which may perform analysis and/or filtering using techniques including those described herein.

A data flagging module 518 (or instructions) may analyze the data and/or perform one or more assessments to the collected one or more queries received by the collection module 516 and/or the data collector to determine if the intercepted one or more queries are an unauthorized access to a database using techniques including those describe herein. The data flagging module 518 may apply match abstract syntax trees using techniques including those described herein, rules, and other analysis techniques to determine if the collected one or more queries should be flagged as an unauthorized access to a database.

For an embodiment, collected queries may be initially identified as an unauthorized access to a database until determined otherwise (e.g., associated with a whitelist) or heuristics find no reason that the one or more queries should be flagged. The data flagging module 518 may perform packet analysis to look for suspicious characteristics in the header, footer, destination IP, origin IP, payload, and the like using techniques including those described herein. Those skilled in the art will appreciate that the data flagging module 518 may perform a heuristic analysis, a statistical analysis, and/or signature identification (e.g., signature-based detection involves searching for known patterns of suspicious data within the collected data's code) to determine if the collected one or more queries are an unauthorized access to a database. A machine-learning based classification model may also be applied for the determination.

The data flagging module 518 may be resident at a data collector, at a system, partially at a data collector, partially at a security server, or on a network device. For example, a router may include a data collector and a data flagging module 518 configured to perform one or more heuristic assessments on the collected queries. A software-defined networking ("SDN") switch is an example of a network device configured to implement data-flagging and filtering functions. If the collected one or more queries are determined to be an unauthorized access to a data base, the router may direct the collected query to a security server.

For an embodiment, the data flagging module 518 may be updated. In one example, the security server may provide new entries for an abstract-syntax-tree whitelist, entries for a blacklist, heuristic algorithms, statistical algorithms, updated rules, and/or new signatures to assist the data flagging module 518 to determine if queries are an unauthorized access to a database. The abstract-syntax-tree whitelists, entries for whitelists, blacklists, entries for blacklists, heuristic algorithms, statistical algorithms, and/or new signatures may be generated by one or more security servers (e.g., via a reporting module 520).

A reporting module 520 (or instructions) is configured to generate an abstract-syntax-tree whitelist based on one or more alerts received, for example from a data collector. Further a reporting module 520 is configured to generate an update to an abstract-syntax-tree whitelist as describe herein.

As indicated above, FIG. 5 is provided as an example. Other examples are possible and may differ from what was described with regard to FIG. 5.

In this way, analysis device 220 uses abstract syntax trees to detect anomalous queries, which may be more flexible and computationally efficient than other approaches for detecting anomalous queries, such as statistical approaches and/or the like. Furthermore, abstract syntax trees enables the usage of threshold-based similarity comparisons between queries and whitelist entries, weighted comparisons between queries and whitelist entries, and/or the like, thereby increasing versatility and effectiveness of implementations described herein and reducing false positives based on inexact matches with the whitelist.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a query for data stored by a database;
determine that a particular number of queries, from one or more sources, were received within a threshold amount of time;
determine that an abstract syntax tree is to be generated for the query based on at least one of:
a source of the query, or
the particular number of queries received within the threshold amount of time;
generate the abstract syntax tree based on the query and based on determining that the abstract syntax tree is to be generated for the query;
determine whether the abstract syntax tree matches a list,
where the list identifies one or more abstract syntax trees corresponding to queries or types of queries; and
selectively perform an action based on whether the abstract syntax tree matches the list.

2. The device of claim 1, where the list identifies permissible queries or types of queries.

3. The device of claim 1, where the one or more processors, when performing the action, are to:
provide the query for use with the database based on determining that the abstract syntax tree matches the list.

4. The device of claim 1, where the one or more processors, when performing the action, are to:
notify an administrator or block a client device from which the query was received based on the abstract syntax tree not matching the list.

5. The device of claim 1, where the one or more processors are to:
receive feedback regarding the query; and
update the list based on the feedback.

6. The device of claim 1, where the one or more processors, when determining whether the abstract syntax tree matches the list, are to:
determine whether the abstract syntax tree matches the list based on a threshold that is based on a comparison of the abstract syntax tree and one or more entries of the list.

7. A non-transitory computer-readable medium storing instructions, the instructions comprising:
one or more instructions that, when executed by one or more processors, cause the one or more processors to:
receive a query for data stored by a database;
determine that a particular number of queries, from one or more sources, were received within a threshold amount of time;
determine that an abstract syntax tree is to be generated for the query based on at least one of:
a source of the query, or
the particular number of queries received within the threshold amount of time;
generate the abstract syntax tree based on the query and based on determining that the abstract syntax tree is to be generated for the query;
determine that the abstract syntax tree matches a list,
where the list identifies one or more abstract syntax trees corresponding to permissible queries or types of queries; and
perform an action based on determining that the abstract syntax tree matches the list.

8. The non-transitory computer-readable medium of claim 7, where the determination that the abstract syntax tree matches the list is based on a partial match between the abstract syntax tree and an entry of the list.

9. The non-transitory computer-readable medium of claim 7, where the action includes blocking the source of the query.

10. The non-transitory computer-readable medium of claim 7, where the action includes providing a notification to a device.

11. The non-transitory computer-readable medium of claim 10, where the notification includes the query.

12. The non-transitory computer-readable medium of claim 7, where the one or more instructions, when executed by the one or more processors, cause the one or more processors to:
receive information identifying the list, where the list is updated periodically.

13. The non-transitory computer-readable medium of claim 7, where the action includes causing a device that stores the database to be quarantined.

14. A method, comprising:
receiving, by a device, a query for data stored by a database;
determining, by the device, that a particular number of queries, from one or more sources, were received within a threshold amount of time;
determining, by the device, that an abstract syntax tree is to be generated for the query based on at least one of:
a source of the query, or
the particular number of queries received within the threshold amount of time;
generating, by the device, the abstract syntax tree based on the query and based on determining that the abstract syntax tree is to be generated for the query;
determining, by the device, whether the abstract syntax tree matches a list,
where the list identifies one or more abstract syntax trees corresponding to queries or types of queries; and
selectively:
providing the query for provision of the data when the abstract syntax tree matches the list, or
notifying another device when the abstract syntax tree does not match the list.

15. The method of claim 14, where the determination of whether the abstract syntax tree matches the list is based on whether similarity of the abstract syntax tree and the one or more abstract syntax trees satisfies a threshold.

16. The method of claim 15, further comprising:
adjusting the threshold based on feedback regarding the determination of whether the abstract syntax tree matches the list.

17. The method of claim 14, where the query comprises a structured query language (SQL) query.

18. The method of claim 14, further comprising:
storing or blocking one or more other queries based on determining that the abstract syntax tree does not match the list.

19. The method of claim 14, further comprising:
adding the abstract syntax tree to the list based on receiving information indicating that the query is permissible.

20. The device of claim 1, where the determination that the abstract syntax tree matches the list is based on a partial match between the abstract syntax tree and an entry of the list.

* * * * *